United States Patent
Zhou et al.

(10) Patent No.: US 12,475,233 B2
(45) Date of Patent: Nov. 18, 2025

(54) DATA PROCESSING METHOD AND APPARATUS

(71) Applicant: Hangzhou AliCloud Feitian Information Technology Co., Ltd., Hangzhou (CN)

(72) Inventors: Hao Zhou, Hangzhou (CN); Ruichao Liu, Hangzhou (CN); Fei Shi, Hangzhou (CN); Kan Dong, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/691,837

(22) PCT Filed: Feb. 3, 2023

(86) PCT No.: PCT/CN2023/074419
§ 371 (c)(1),
(2) Date: Mar. 13, 2024

(87) PCT Pub. No.: WO2023/155697
PCT Pub. Date: Aug. 24, 2023

(65) Prior Publication Data
US 2024/0394380 A1 Nov. 28, 2024

(30) Foreign Application Priority Data
Feb. 15, 2022 (CN) .......................... 202210138769.4

(51) Int. Cl.
*G06F 11/36* (2025.01)
*G06F 11/07* (2006.01)
(Continued)

(52) U.S. Cl.
CPC ........ *G06F 21/577* (2013.01); *G06F 11/0793* (2013.01); *G06F 21/74* (2013.01)

(58) Field of Classification Search
None
See application file for complete search history.

(56) References Cited

U.S. PATENT DOCUMENTS

2006/0195745 A1* 8/2006 Keromytis .......... G06F 11/0742
714/741
2008/0083030 A1 4/2008 Durham et al.
(Continued)

FOREIGN PATENT DOCUMENTS

CN 104424442 A 3/2015
CN 10457909 A 11/2019
(Continued)

OTHER PUBLICATIONS

Notice of Allowance as received in connection with Chinese Application No. 202210138769.4, dated Jun. 13, 2024.
(Continued)

*Primary Examiner* — Christopher B Robinson
(74) *Attorney, Agent, or Firm* — Maschoff Brennan (57) ABSTRACT

A data processing method, applied to a target device in which a Linux operating system is running. A first program is deployed in the Linux operating system. The method includes: loading a target loading and invasion machine into a first memory space of the first program, and acquiring a vulnerability repair library for the first program through the target loading and invasion machine; creating, in the first memory space, a second memory space for the target loading and invasion machine, and configuring a second runtime environment isolated from a first runtime environment of the first program; and loading the vulnerability repair library in the second memory space based on the second runtime environment, and performing a vulnerability
(Continued)

Loading a target loading and invasion machine into a first memory space of the first program, and acquiring a vulnerability repair library for the first program through the target loading and invasion machine — 101

Creating, in the first memory space, a second memory space for the target loading and invasion machine, and configuring a second runtime environment isolated from a first runtime environment of the first program, where the second memory space is simply available to the target loading and invasion machine and to a program loadable by the target loading and invasion machine — 102

Loading the vulnerability repair library in the second memory space based on the second runtime environment, and performing a vulnerability repair on the first program by using the vulnerability repair library — 103 repair on the first program by using the vulnerability repair library.

20 Claims, 9 Drawing Sheets

(51) Int. Cl.
    *G06F 21/56*     (2013.01)
    *G06F 21/57*     (2013.01)
    *G06F 21/74*     (2013.01)

(56) References Cited

U.S. PATENT DOCUMENTS

| | | | | |
|---|---|---|---|---|
| 2008/0271025 A1* | 10/2008 | Gross | ................... | G06F 21/577 |
| | | | | 718/102 |
| 2010/0293407 A1* | 11/2010 | Locasto | ............. | G06F 11/3672 |
| | | | | 714/2 |
| 2017/0206357 A1* | 7/2017 | Gorelik | ................... | G06F 21/54 |
| 2019/0138725 A1* | 5/2019 | Gupta | ..................... | G06F 9/485 |
| 2020/0311268 A1 | 10/2020 | Kostyushko et al. | | |
| 2021/0026947 A1 | 1/2021 | Korotaev | | |

FOREIGN PATENT DOCUMENTS

| | | | | |
|---|---|---|---|---|
| CN | 111858004 A | 10/2020 | | |
| CN | 112906008 A | 6/2021 | | |
| CN | 113158191 A | * 7/2021 | .......... | G06F 21/577 |
| CN | 114595461 A | 6/2022 | | |
| CN | 114595462 A | 6/2022 | | |
| WO | 2008008675 A2 | 1/2008 | | |

OTHER PUBLICATIONS

China National Intellectual Property Adminstration; International Search Report and Written Opinion issued in PCT App No. PCT/CN2023/074419 dated May 31, 2023, 14 pages.

* cited by examiner

DATA PROCESSING METHOD AND APPARATUS

CROSS-REFERENCE TO RELATED APPLICATIONS

This application is a National Stage of International Application No. PCT/CN2023/074419, and filed on Feb. 3, 2023, which claims priority to Chinese Patent Application No. 202210138769.4, filed with the China National Intellectual Property Administration on Feb. 15, 2022 and entitled "Data Processing Method and Apparatus". The disclosures of the aforementioned applications are hereby incorporated by reference in their entireties.

TECHNICAL FIELD

The present disclosure relates to the field of computer technologies and, in particular, to a data processing method and apparatus.

BACKGROUND

With the development of science and technology, there is an increasing demand for smart devices in the fields such as smart home, smart security, and smart industry. The number of smart devices for accessing, such as Internet of Things devices, has grown rapidly in recent years, which has surpassed the increasing rate of mobile devices.

Among these smart devices, the Linux operating system is one of the most widely used operating systems. However, the Linux operating system has its distributions expanded from several in the traditional IT security field to dozens or even hundreds. Due to the diversity of the distributions, traditional vulnerability repair methods are difficult to apply.

SUMMARY

In view of the aforementioned problem, a data processing method and apparatus are proposed for overcoming the aforementioned problem or at least partially addressing the aforementioned problem.

The data processing method is applied to a target device in which a Linux operating system is running, where a first program is deployed in the Linux operating system, and the method includes:
  loading a target loading and invasion machine into a first memory space of the first program, and acquiring a vulnerability repair library for the first program through the target loading and invasion machine;
  creating, in the first memory space, a second memory space for the target loading and invasion machine, and configuring a second runtime environment isolated from a first runtime environment of the first program, where the second memory space is simply available to the target loading and invasion machine and to a program loadable by the target loading and invasion machine; and
  loading the vulnerability repair library in the second memory space based on the second runtime environment, and performing a vulnerability repair on the first program by using the vulnerability repair library.

In an implementation, before performing the vulnerability repair on the first program by using the vulnerability repair library, the method further includes:
  invading target location content in the first program according to invasion and mounting guidance information in the vulnerability repair library, and establishing a mounting relation between the target location content and the vulnerability repair library;
  the performing the vulnerability repair on the first program by using the vulnerability repair library includes:
  performing the vulnerability repair on the first program by performing, when the first program calls the target location content, a guidance to the vulnerability repair library according to the mounting relation.

In an implementation, the method further includes:
  returning to an execution flow of the first program after the vulnerability repair is completed.

In an implementation, before invading the target location content in the first program according to the invasion and mounting guidance information in the vulnerability repair library, and establishing the mounting relation between the target location content and the vulnerability repair library, the method further includes:
  performing signature verification on the vulnerability repair library by using preset public key information; and
  after the signature verification is passed, rendering executions of invading the target location content in the first program according to the invasion and mounting guidance information in the vulnerability repair library and establishing the mounting relation between the target location content and the vulnerability repair library.

In an implementation, the target loading and invasion machine includes: an invader for performing invasion and mounting for the first program; and a loader for creating the second memory space, configuring the second runtime environment, and loading the vulnerability repair library.

In an implementation, the vulnerability repair library is acquired by the target loading and invasion machine from a cloud.

In an implementation, the target device is an Internet of Things device, and the first program is a user mode program.

The data processing apparatus is applied to a target device in which a Linux operating system is running, where a first program is deployed in the Linux operating system, and the apparatus includes:
  a vulnerability repair library acquiring module, configured to load a target loading and invasion machine into a first memory space of the first program, and acquire a vulnerability repair library for the first program through the target loading and invasion machine;
  a second runtime environment configuring module, configured to create, in the first memory space, a second memory space for the target loading and invasion machine, and configure a second runtime environment isolated from a first runtime environment of the first program, where the second memory space is simply available to the target loading and invasion machine and to a program loadable by the target loading and invasion machine; and
  a vulnerability repairing module, configured to load the vulnerability repair library in the second memory space based on the second runtime environment, and perform a vulnerability repair on the first program by using the vulnerability repair library.

An electronic device includes a processor, a memory, and a computer program stored in the memory and capable of running on the processor, where the computer program, when executed by the processor, implements the data processing method as described above.

A computer-readable storage medium has a computer program stored thereon, where the computer program, when executed by a processor, implements the data processing method as described above.

Embodiments of the present disclosure have the following advantages.

In the embodiments of the present disclosure, a vulnerability repair across Linux distributions is achieved by means of: loading the target loading and invasion machine into the first memory space of the first program deployed in the Linux operating system, and acquiring the vulnerability repair library for the first program through the target loading and invasion machine; creating, in the first memory space, the second memory space for the target loading and invasion machine, and configuring the second runtime environment isolated from the first runtime environment of the first program; and then loading the vulnerability repair library in the second memory space based on the second runtime environment, and performing the vulnerability repair on the first program by using the vulnerability repair library. The present disclosure is applicable to different Linux distributions, and only one compilation is required. Therefore, the compilation of a different set of binary codes for each Linux distribution is avoided, and the difficulty of the vulnerability repair is reduced.

BRIEF DESCRIPTION OF DRAWINGS

In order to describe technical solutions in the present disclosure more clearly, the drawings used in the description of the present disclosure will be briefly described hereunder. Apparently, the drawings in the following description are some embodiments of present disclosure. For persons of ordinary skill in the art, other drawings may be obtained based on these drawings without any creative effort.

DESCRIPTION OF EMBODIMENTS

In order to make the aforementioned objectives, characteristics and advantages of the present disclosure more evident and comprehensible, the present disclosure will be described hereunder in further details in conjunction with the drawings and the implementations. Apparently, the described embodiments are only some embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
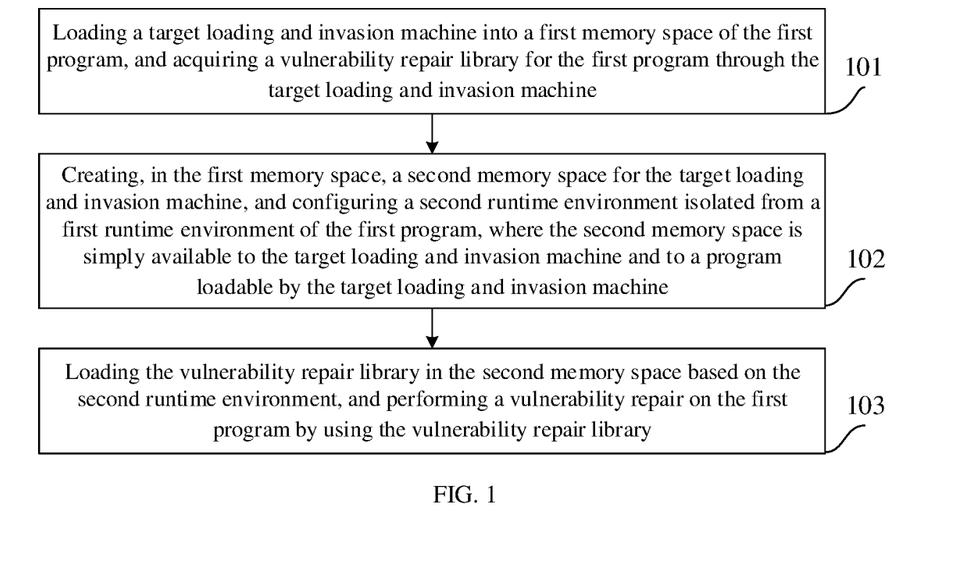
FIG. 1 is a flowchart of steps of a data processing method according to an embodiment of the present disclosure.

Reference is made to FIG. 1, FIG. 1 shows a flowchart of steps of a data processing method according to an embodiment of the present disclosure. The method can be applied to a target device in which a Linux operating system is running. The target device may be an Internet of Things device. The Linux operating system may be deployed with a first program, that is, a host program. Compared with a security service program and a vulnerability repair library, the first program is a protected program.

The first program may be a user application running in a Linux operating system, or may be a command line tool, or may be a service-level application service or a program running based on a container environment, that is, it is a user-mode program. Programs in a Linux operating system are divided into a kernel mode program and a user mode program. The kernel mode program is maintained by a team of a Linux open source, to provide encapsulation of hardware for a lower computer layer and provide a unified system call interface for the user mode program, achieving differential shielding for hardware, a network and a file system. The user mode program refers to an application program developed by a developer based on a Linux kernel, such as a browser, communication software, picture processing software, and photographing software.

Specifically, the following steps may be included.

Step 101, loading a target loading and invasion machine into a first memory space of the first program, and acquiring a vulnerability repair library for the first program through the target loading and invasion machine.

The target loading and invasion machine (LLIM, Linux Loading and Invasion Machine) may be a binary dynamic loader, which is a shared library that is loadable with the loading of a program in an operating system, and which may have two functions.

On the one hand, as an ordinary shared library independent of the binary link location, the LLIM may be loaded into a memory space of the program (namely, the first memory space) by the loader of the operating system.

On the other hand, the LLIM may be a loader having a self-contained space (namely, the second memory space) and a thread isolation mechanism in itself, through which other programs, such as a security service program and a vulnerability repair library, may be loaded. Moreover, the other programs are running in a process space of the host program (namely, the first program) in a threaded manner.

Inside the LLIM, a "thread isolation" mechanism can be provided, to ensure that the LLIM itself and other ELF shared libraries loaded by the LLIM are in the memory, and in the continuation and the execution flow of the host program, the thread context thereof is completely independent. That is, when the executable codes run in the LLIM body or a memory code range of the binary library into which the executable codes are loaded, resources such as the thread stack, the private variable, and the lock are independent and autonomous, thereby ensuring that the LLIM and all ELFs loaded by the LLIM can run in any Linux host environment.

Figure 2A:
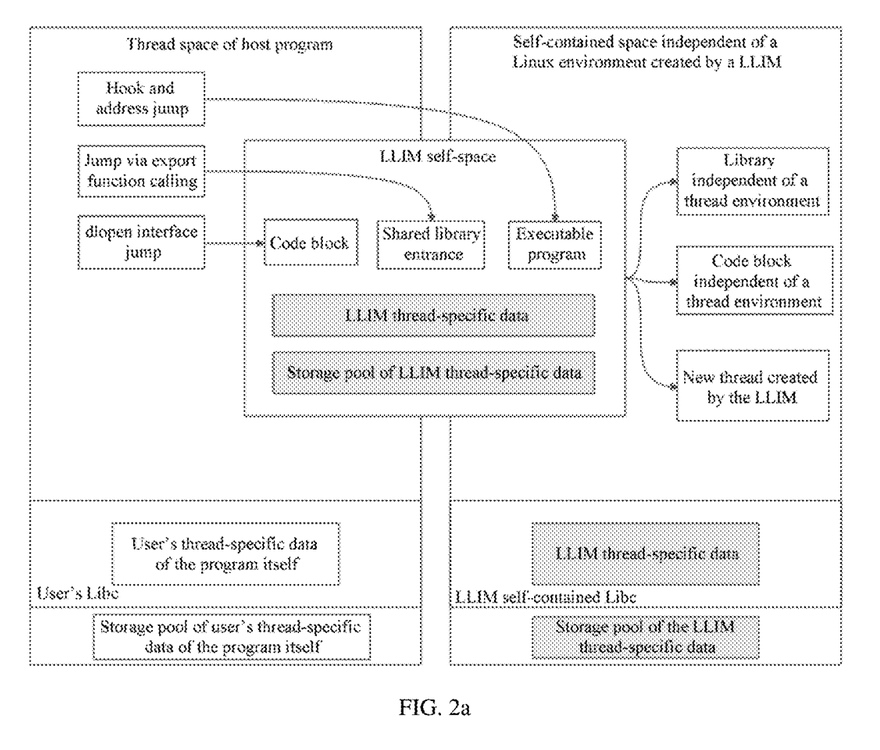
FIG. 2a is a schematic diagram of internal running of a program according to an embodiment of the present disclosure.

As shown in FIG. 2a, besides the thread-specific data and storage pools of thread-specific data in the user's Libc of the host program and the LLIM self-contained Libc, a self-contained space (namely, the second memory space) isolated from the thread space of the host program can be created through the thread isolation mechanism.

The thread space of the host program may be jumped to an executable program, a shared library entrance, and a code block in the LLIM self-space by means of Hook and address jump, jump via export function calling, dlopen interface jump, etc. The self-contained space, independent of the Linux environment, created by the LLIM may have a library independent of the thread environment, a code block independent of the thread environment, and a new thread created by the LLIM.

Specifically, the LLIM can include an invader and a loader, where the invader may be configured to perform invasion and mounting on the first program, and the loader may be configured to create the second memory space, configure a second runtime environment, and load a vulnerability repair library.

Figure 2B:
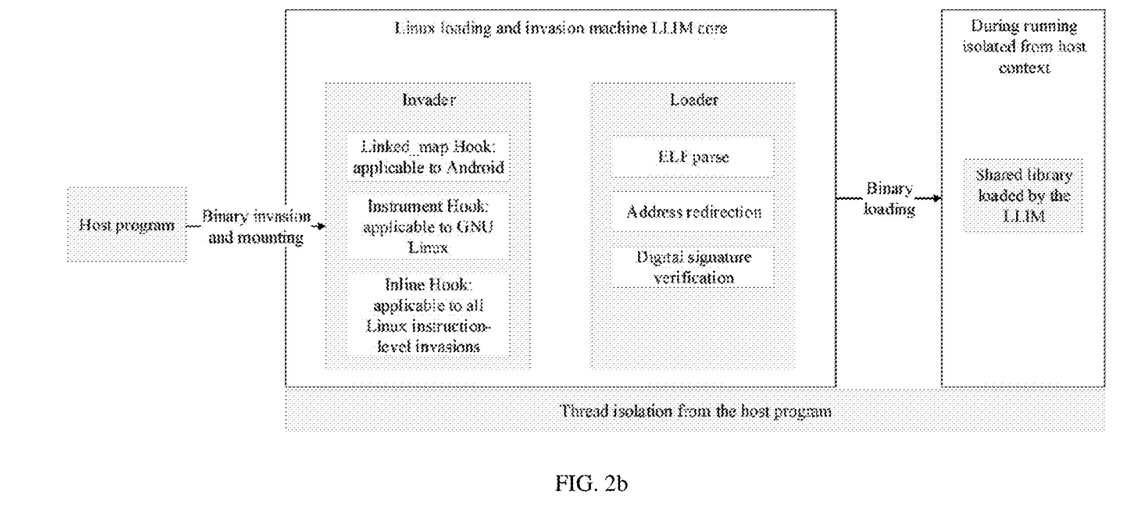
FIG. 2b is a schematic diagram of internal running of another program according to an embodiment of the present disclosure.

As shown in FIG. 2b, the host program invade and is mounted to a Linux loading and invasion machine LLIM core by means of binary; the host program invades and hooks up to any position of executable codes in the user mode ELF memory of a heterogeneous Linux; and an additional ELF loader isolated from the host program (independent from a host context) is deployed at a hooking point, which is configured to load, as needed, a shared library isolated from the context of the host program. The invader in the Linux loading and invasion machine LLIM core may have a Linked map Hook (applicable to Android), an Instrument Hook (applicable to GNU Linux), and an Inline Hook (applicable to all Linux instruction-level invasions). The loader may have functions of ELF parse, address redirection, and digital signature verification.

In a Linux operating system to be detected and to be repaired, a LLIM loading and invasion machine is implanted, and can be loaded to a first memory space of a first program when the first program in the system starts running, keeping alive in the first program body. Specifically, before the running of the first program, the Linux operating system would be responsible for loading a shared library as required for the first program, the LLIM can be loaded into the process space of the first program in a form of the shared library.

In a specific implementation, the vulnerability repair library is acquired by the LLIM from a cloud, and the LLIM may be linked to a cloud-side binary vulnerability patch library via a network; and once a new patch repair push of the vulnerability repair library is received, a repair patch is immediately downloaded to the vulnerability repair library.

Figure 2C:
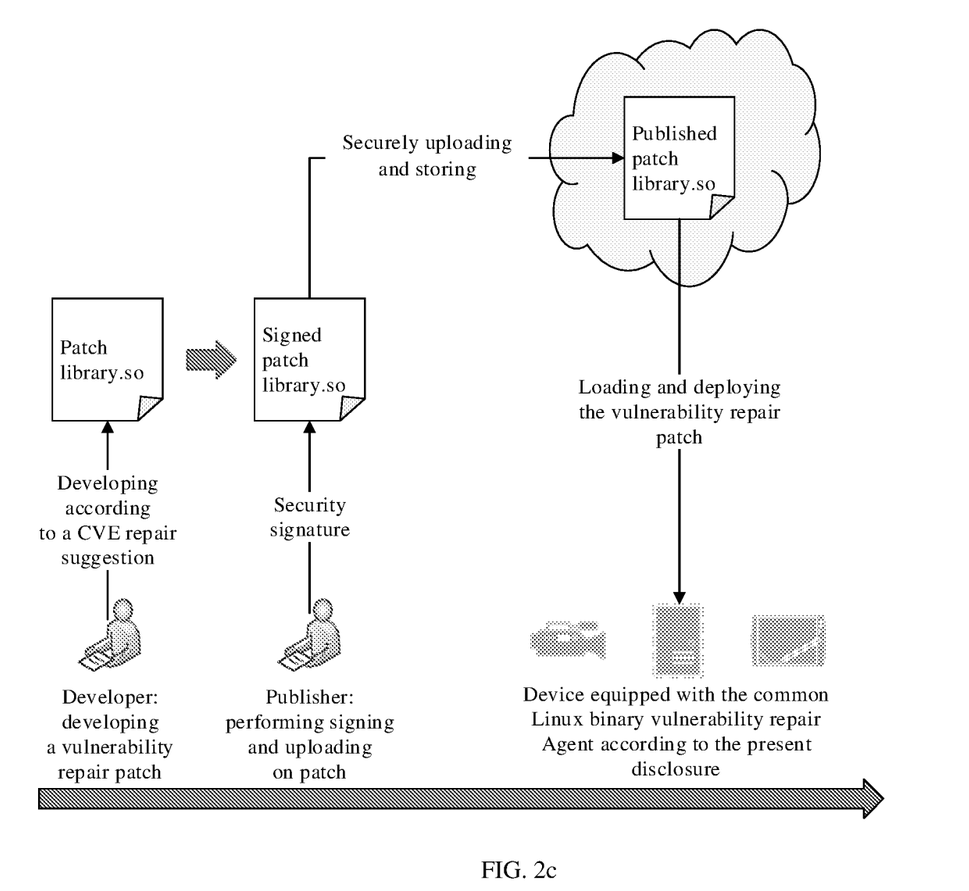
FIG. 2c is a schematic diagram of patch downloading according to an embodiment of the present disclosure.

It should be noted that, as shown in FIG. 2c, a developer develops a vulnerability repair patch according to a CVE repair suggestion, the patch is then signed and uploaded to the cloud by the publisher, and then the vulnerability repair patch is downloaded and deployed by a device equipped with the common Linux binary vulnerability repair Agent according to the present disclosure.

Specifically, by implanting an agent for vulnerability scanning inside the Linux system, one-to-one matching of vulnerabilities of a target binary object (an executable program, a shared library) with vulnerability library information of CVEs (Common Vulnerabilities & Exposures, common vulnerabilities and exposures) can be completed, and a vulnerability generating mechanism and some repair suggestions can be retrieved from the CVE information.

According to vulnerability repair mechanism and the repair suggestions provided from the CVE information, the repair patch developer can develop a targeted repair patch, and the repair logic requires completely replacing or partially replacing executable codes in which a vulnerability occurs, or requires a series of boundary checks on a parameter of the codes, a return value, or the like.

After the vulnerability repair patch is developed, construction is performed in conjunction with a specific libc environment supported by the LLIM, to generate a dynamically linkable shared library, and in further, invasion and mounting guidance information can be added thereto. The invasion and mounting guidance information can be used for indicating, during the operation, invasion and hooking for a first program to be repaired.

Step 102, creating, in the first memory space, a second memory space for the target loading and invasion machine, and configuring a second runtime environment isolated from a first runtime environment of the first program, where the second memory space is simply available to the target loading and invasion machine and to a program loadable by the target loading and invasion machine.

For the LLIM, it is possible to create, in the first memory space, a second memory space for the LLIM. The second memory space is simply available to the LLIM and to a program loadable by the LLIM, that is, the self-contained space of the LLIM. The self-contained space is a namespace created by the Linux process loader to conform to the link of its own libc library, and in this space, the loader only loads, for the application program, a shared library file under a specific directory.

In the second memory space, a second runtime environment isolated from the first runtime environment of the first program can be configured, which may include linking to a shared library, initializing thread context, starting a thread, etc. Initializing the thread context may include initialization of stacks, thread-specific variables, device and memory management, and others.

Step 103, loading the vulnerability repair library in the second memory space based on the second runtime environment, and performing a vulnerability repair on the first program by using the vulnerability repair library.

In an embodiment of the present disclosure, before performing the vulnerability repair on the first program by using the vulnerability repair library, the method further includes: invading target location content in the first program according to invasion and mounting guidance information in the vulnerability repair library, and establishing a mounting relation between the target location content and the vulnerability repair library.

In an embodiment of the present disclosure, the performing the vulnerability repair on the first program by using the vulnerability repair library may include: performing the vulnerability repair on the first program by performing, when the first program calls the target location content, a guidance to the vulnerability repair library according to the mounting relation.

The invasion and mounting guidance information may include repairing a name of a target library, repairing a symbol name of a target function, repairing a target mounting address (namely, the target location content), a symbol name and address of a patch function entrance.

After the vulnerability repair library is downloaded, it is possible to read the binary invasion and mounting guidance information therein, accurately invade the target location content in the first program based on the invasion and mounting guidance information, and establish a mounting relation between the target location content and the vulnerability repair library.

On the basis of a memory code space independent of the host program context (namely, the second memory space) as created by the LLIM, the vulnerability repair library can be loaded in the space, and the logic of invasion and mounting can be directed to the logic of the vulnerability repair library for execution, overwriting original service logic with a vulnerability in the target location content of the first program.

In an embodiment of the present disclosure, the method further includes: returning to an execution flow of the first program after the vulnerability repair is completed.

After the vulnerability repair is ended, it is likely to return to a process of the host program (namely, the first program).

In an embodiment of the present disclosure, before invading the target location content in the first program according to the invasion and mounting guidance information in the vulnerability repair library, and establishing the mounting relation between the target location content and the vulnerability repair library, the method further includes:

performing signature verification on the vulnerability repair library by using preset public key information; and after the signature verification is passed, rendering executions of invading the target location content in the first program according to the invasion and mounting guidance information in the vulnerability repair library and establishing the mounting relation between the target location content and the vulnerability repair library.

Since the vulnerability repair library can perform digital signing by using a digital signature generation tool in conjunction with a secret key pair of an RSA system, and put the signature information into a digital signature section for decryption and signature verification by using a LLIM public key during the operation, so as to prevent forging of a patch.

After the vulnerability repair library is downloaded, the LLIM can read the content of the digital signature segment of the patch library, perform signature verification by using a built-in public key, and perform a subsequent operation after the verification is passed.

Figure 2D:
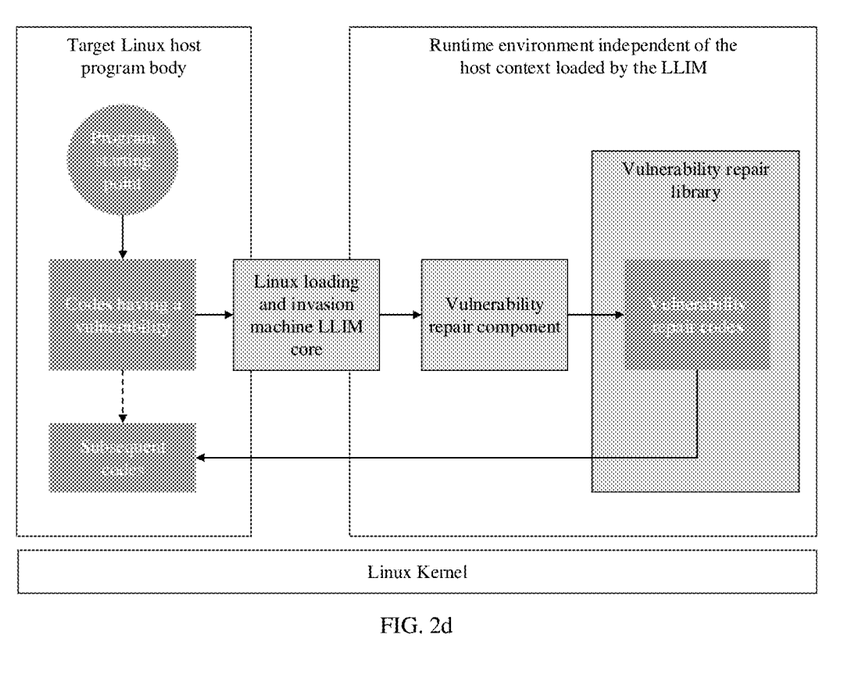
FIG. 2d is a schematic diagram of internal running of another program according to an embodiment of the present disclosure.

As shown in FIG. 2d, on the basis of the Linux Kernel, a target Linux host program body (namely, the first program) triggers a program starting point for program running; a vulnerability repair component can be called in a runtime environment independent of the host context by the Linux loading and invasion machine LLIM core when codes having a vulnerability (namely, the target location content) are called. The vulnerability repair component can perform a vulnerability repair by using vulnerability repair codes in the vulnerability repair library, and can return subsequent codes of the target Linux host program body after the repairing is completed.

Figure 2E:
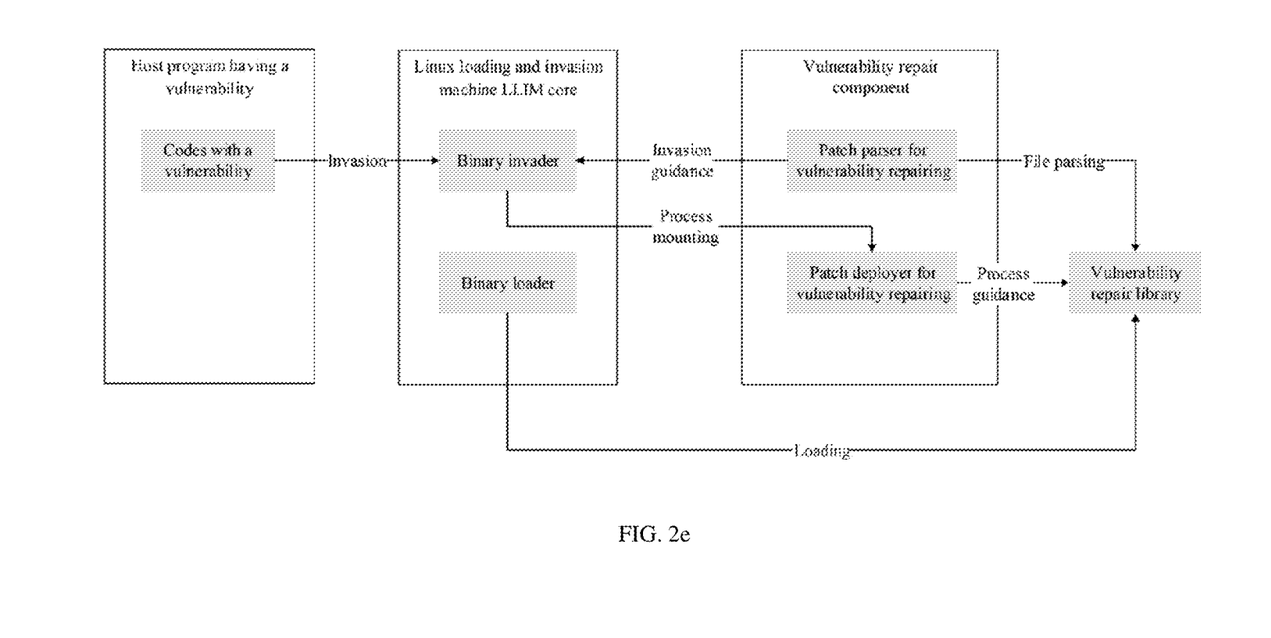
FIG. 2e is a schematic diagram of internal running of another program according to an embodiment of the present disclosure.

Specifically, as shown in FIG. 2e, the patch parser for vulnerability repairing in the vulnerability repair component can parse a patch file in the vulnerability repair library, and in turn, can guide an invasion. A binary invader in the Linux loading and invasion machine LLIM core can invade vulnerability codes in a host program having a vulnerability, and the process is mounted to a patch deployer for vulnerability repairing in the vulnerability repair component, where the patch deployer for vulnerability repairing is configured to guide the process to the vulnerability repair library; and a binary loader in the Linux loading and invasion machine LLIM core can load the vulnerability repair library.

The vulnerability repair component contains the patch parser and the patch deployer for vulnerability repairing. The patch parser for vulnerability repairing is a parser for an ELF file, and can parse information on each segment and section according to a header of the ELF file. After the LLIM completes loading of the vulnerability repair library, the patch deployer will perform a jump guidance on a logical address of a target to be repaired, thereby achieving a jump from a vulnerability program to a patch program.

In the embodiments of the present disclosure, a vulnerability repair across Linux distributions is achieved by means of: loading the target loading and invasion machine into the first memory space of the first program deployed in the Linux operating system, and acquiring the vulnerability repair library for the first program through the target loading and invasion machine; creating, in the first memory space, the second memory space for the target loading and invasion machine, and configuring the second runtime environment isolated from the first runtime environment of the first program; and then loading the vulnerability repair library in the second memory space based on the second runtime environment, and performing the vulnerability repair on the first program by using the vulnerability repair library. The present disclosure is applicable to different Linux distributions, and only one compilation is required. Therefore, the compilation of a different set of binary codes for each Linux distribution is avoided, and the difficulty of the vulnerability repair is reduced.

Figure 3:
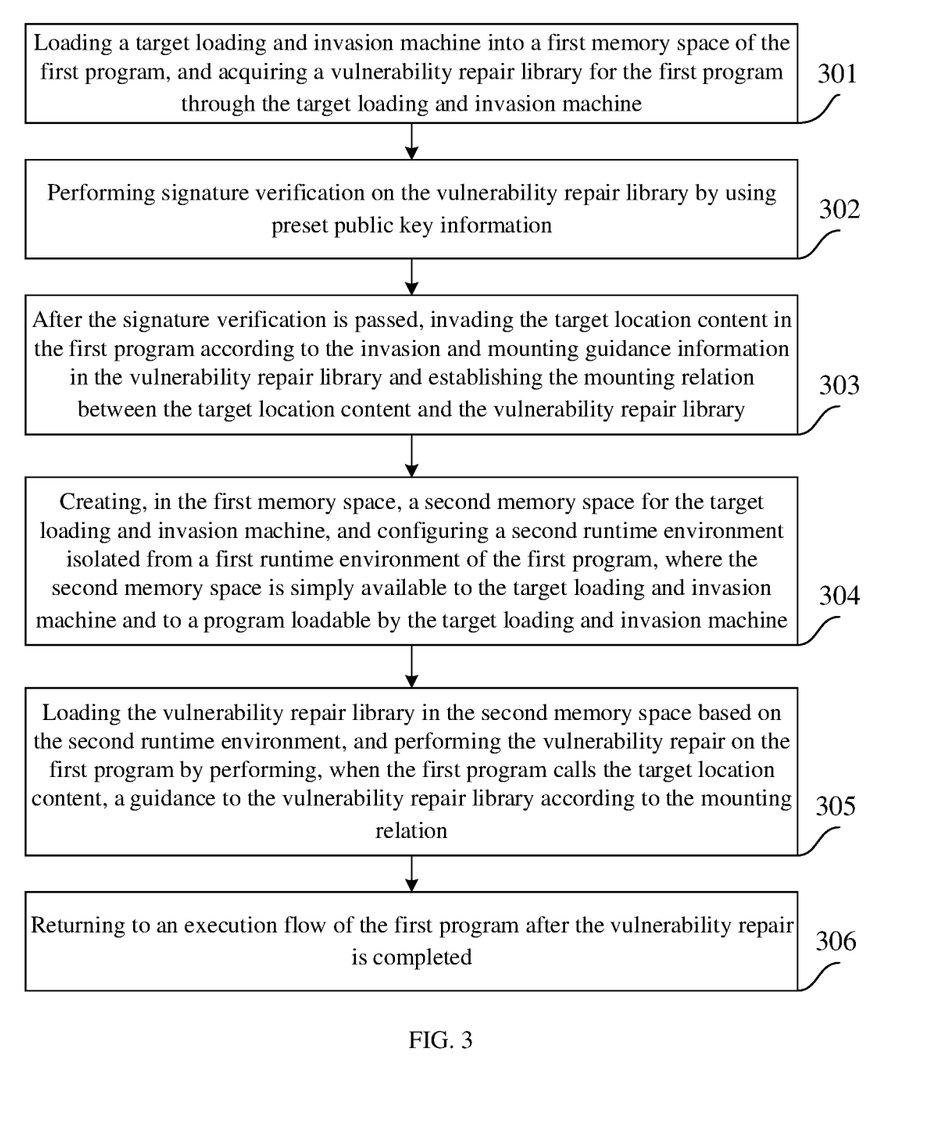
FIG. 3 is a flowchart of steps of another data processing method according to an embodiment of the present disclosure.

Reference is made to FIG. 3, FIG. 3 shows a flowchart of steps of another data processing method according to an embodiment of the present disclosure. Specifically, the following steps may be included.

Step 301, loading a target loading and invasion machine into a first memory space of the first program, and acquiring a vulnerability repair library for the first program through the target loading and invasion machine.

In a Linux operating system to be detected and to be repaired, a LLIM loading and invasion machine is implanted, and can be loaded to a first memory space of a first program when the first program in the system starts running, keeping alive in the first program body. Specifically, before the running of the first program, the Linux operating system would be responsible for loading a shared library as required for the first program, the LLIM can be loaded into the process space of the first program in a form of the shared library.

In a specific implementation, the vulnerability repair library is acquired by the LLIM from a cloud, and the LLIM may be linked to a cloud-side binary vulnerability patch library via a network; and once a new patch repair push of the vulnerability repair library is received, a repair patch is immediately downloaded to the vulnerability repair library.

Step 302, performing signature verification on the vulnerability repair library by using preset public key information.

Since the vulnerability repair library can perform digital signing by using a digital signature generation tool in conjunction with a secret key pair of an RSA system, and put the signature information into a digital signature section for decryption and signature verification by using a LLIM public key during the operation, so as to prevent forging of a patch.

After the vulnerability repair library is downloaded, the LLIM can read the content of the digital signature segment of the patch library, perform signature verification by using a built-in public key, and perform a subsequent operation after the verification is passed.

Step 303, after the signature verification is passed, invading the target location content in the first program according to the invasion and mounting guidance information in the vulnerability repair library and establishing the mounting relation between the target location content and the vulnerability repair library.

The invasion and mounting guidance information may include repairing a name of a target library, repairing a symbol name of a target function, repairing a target mounting address (namely, the target location content), a symbol name and address of a patch function entrance.

After the vulnerability repair library is downloaded, it is possible to read the binary invasion and mounting guidance information therein, accurately invade the target location content in the first program based on the invasion and mounting guidance information, and establish a mounting relation between the target location content and the vulnerability repair library.

Step 304, creating, in the first memory space, a second memory space for the target loading and invasion machine, and configuring a second runtime environment isolated from a first runtime environment of the first program, where the second memory space is simply available to the target loading and invasion machine and to a program loadable by the target loading and invasion machine.

For the LLIM, it is possible to create, in the first memory space, a second memory space for the LLIM. The second memory space is simply available to the LLIM and to a program loadable by the LLIM, that is, the self-contained space of the LLIM. The self-contained space is a namespace created by the Linux process loader to conform to the link of its own libc library, and in this space, the loader only loads, for the application program, a shared library file under a specific directory.

In the second memory space, a second runtime environment isolated from the first runtime environment of the first program can be configured, which may include linking to a shared library, initializing thread context, starting a thread, etc. Initializing the thread context may include initialization of stacks, thread-specific variables, device and memory management, and others.

Step 305, loading the vulnerability repair library in the second memory space based on the second runtime environment, and performing the vulnerability repair on the first program by performing, when the first program calls the target location content, a guidance to the vulnerability repair library according to the mounting relation.

On the basis of a memory code space independent of the host program context (namely, the second memory space) as created by the LLIM, the vulnerability repair library can be loaded in the space, and the logic of invasion and mounting can be directed to the logic of the vulnerability repair library for execution, overwriting original service logic with a vulnerability in the target location content of the first program.

Step 306, returning to an execution flow of the first program after the vulnerability repair is completed.

After the vulnerability repair is ended, it is likely to return to a process of the host program (namely, the first program).

Figure 4:
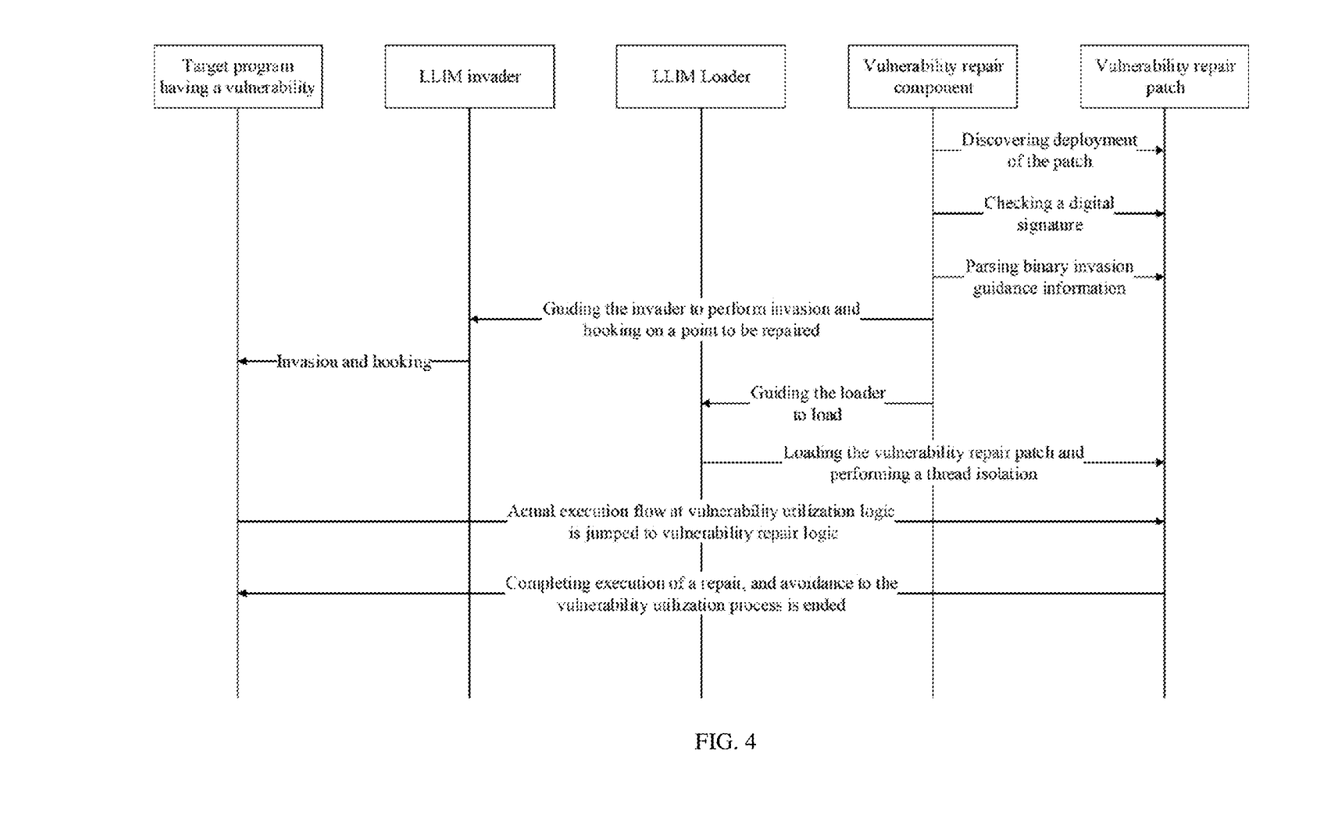
FIG. 4 is a flowchart of steps of a data processing instance according to an embodiment of the present disclosure.

An embodiment of the present disclosure will be exemplarily described hereunder with reference to FIG. 4.

1. A vulnerability repair component discovers deployment of a vulnerability repair patch, checks a digital signature thereof, and parses invasion guidance information (namely, invasion and mounting guidance information) after the digital signature check is passed, and then guides a LLIM invader to perform invasion and hooking on a point to be repaired (namely, the target location content).

2. The LLIM invader performs invasion and hooking on a target program with a vulnerability (namely, the first program).

3. The vulnerability repair component guides a LLIM loader to load the vulnerability repair patch and perform a thread isolation.

4. An actual execution flow of the target program with the vulnerability at vulnerability utilization logic is jumped to vulnerability repair logic, and the vulnerability repair patch executes a repair, and returns to the target program after the repair is completed.

Specifically, compared with traditional IT security vulnerability repair, mobile repair of mobile devices and vulnerability repair of cloud servers, there are the following advantages:

1. the adopted mounting technology combines three kinds of schemes, i.e., Link map, Instrument and Inline, thereby effectively invading an ELF of any Linux system, and capable of competing against an RELRO defense mechanism such as an Android process;

2. the development of a vulnerability repair patch is simple, and it is only necessary to manually develop the patch according to a CVE vulnerability mechanism and a repair suggestion; furthermore, there is a unified compilation environment, and compilation environments across Linux distributions (for example, a development environment and a tool chain across GNU-Linux, across Android, and across OpenWRT) are not required;

3. the deployment is accurate in terms its implementation process, and users only need to accurately develop HOOK point information and restoration logic for a user mode program in a specific host system and perform directional deployment, thereby avoiding risks caused by significant influence from restoration in a kernel mode, and non-recoverability and irrevocability; and 4. hot fixing can be performed; and the LLIM monitors patch issuance information online in real time, and can execute eager loading of modification of a memory-based ELF. The process is not restarted, and the device is not stopped, which greatly facilitates the use of an Internet of Things device.

It should be noted that, for brevity of description, the method embodiments are described as a series of action combinations. However, persons skilled in the art should know that the embodiments of the present disclosure are not limited by the sequence of actions as described, since, according to the embodiments of the present disclosure, some steps may be performed in another sequence or simultaneously. Next, those skilled in the art should also know that the embodiments described in the description are preferred embodiments, and the involved actions are not necessarily required in the embodiments of the present disclosure.

Figure 5:
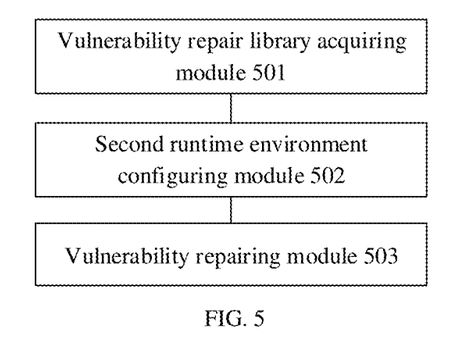
FIG. 5 is a structural block diagram of a data processing apparatus according to an embodiment of the present disclosure.

Reference is made to FIG. 5, FIG. 5 shows a schematic structural diagram of a data processing apparatus according to an embodiment of the present disclosure. The apparatus can be applied to a target device in which a Linux operating system is running, where a first program is deployed in the Linux operating system, and the apparatus may specifically include the following modules:

a vulnerability repair library acquiring module 501, configured to load a target loading and invasion machine into a first memory space of the first program, and acquire a vulnerability repair library for the first program through the target loading and invasion machine;

a second runtime environment configuring module 502, configured to create, in the first memory space, a second memory space for the target loading and invasion machine, and configure a second runtime environment isolated from a first runtime environment of the first program, where the second memory space is simply available to the target loading and invasion machine and to a program loadable by the target loading and invasion machine; and a vulnerability repairing module 503, configured to load the vulnerability repair library in the second memory space based on the second runtime environment, and perform a vulnerability repair on the first program by using the vulnerability repair library.

In an embodiment of the present disclosure, the apparatus may further include:

a mounting relation establishing module, configured to invade target location content in the first program according to invasion and mounting guidance information in the vulnerability repair library, and establish a mounting relation between the target location content and the vulnerability repair library.

In an embodiment of the present disclosure, the vulnerability repairing module 503 may include:

a mounting position repairing sub-module, configured to perform the vulnerability repair on the first program by performing, when the first program calls the target location content, a guidance to the vulnerability repair library according to the mounting relation.

In an embodiment of the present disclosure, the apparatus may further include:

a return execution module, configured to return to an execution flow of the first program after the vulnerability repair is completed.

In an embodiment of the present disclosure, the apparatus may further include:

a signature verifying module, configured to perform signature verification on the vulnerability repair library by using preset public key information; and call the mounting relation establishing module after the signature verification is passed.

In an embodiment of the present disclosure, the target loading and invasion machine includes: an invader for performing invasion and mounting for the first program; and a loader for creating the second memory space, configuring the second runtime environment, and loading the vulnerability repair library.

In an embodiment of the present disclosure, the vulnerability repair library is acquired by the target loading and invasion machine from a cloud.

In an embodiment of the present disclosure, the first program is a user mode program.

An embodiment of the present disclosure further provides an electronic device which may include a processor, a memory, and a computer program stored on the memory and capable of running on the processor, where the computer program, when executed by the processor, implements the data processing method as described above.

An embodiment of the present disclosure further provides a computer-readable storage medium having a computer program stored thereon, where the computer program, when executed by a processor, implements the data processing method as described above.

For the apparatus embodiments, since they are basically similar to the method embodiments, the description thereof is relatively simple. Reference can be made to partial description of the method embodiments for relevant parts.

The respective embodiments are described in the specification progressively, and each embodiment focuses on differences from other embodiments. For the same or similar part between the embodiments, reference may be made to each other.

Those skilled in the art should understand that the embodiments of the present disclosure can be provided as a method, an apparatus, or a computer program product. Therefore, the embodiments of the present disclosure can adopt the form of a complete hardware embodiment, a complete software embodiment, or a combination of software and hardware embodiments. Moreover, the embodiments of the present disclosure can adopt the form of a computer program product implemented on one or more computer-usable storage media (including but not limited to a magnetic disk memory, a CD-ROM, an optical memory and the like) containing computer-usable program codes therein.

The embodiments of the present disclosure are described with reference to flow charts and/or block diagrams of methods, terminal devices (systems) and computer program products according to the embodiments of the present disclosure. It will be appreciated that computer program instructions can implement each flow and/or block in the flow charts and/or the block diagrams, and a combination of a flow and/or a block in the flow charts and/or the block diagrams. These computer program instructions may be provided to a processor of a general purpose computer, a special purpose computer, an embedded processor or other programmable data processing terminal devices to generate a machine, so that instructions executed by the processor of the computers or other programmable data processing terminal devices generate a device for implementing functions specified in one or more flows of the flow charts and/or one or more blocks of the block diagrams.

These processor program instructions may also be stored in a computer-readable memory capable of directing the computers or other programmable data processing terminal devices to operate in a specific manner, so that instructions stored in the computer-readable memory generate a manufactured product including an instruction device, where the instruction device implements functions specified in one or more flows of the flow charts and/or one or more blocks of the block diagrams.

These computer program instructions may also be loaded in the computers or other programmable data processing terminal devices, so that a series of operation steps are performed in the computers or other programmable terminal devices to generate a computer-implemented process, and thus the instructions executed on the computers or other programmable devices provide steps for implementing the functions specified in one or more flows of the flow charts and/or one or more blocks of the block diagrams.

Although preferred embodiments of the present disclosure have been described, those skilled in the art can make additional variations and modifications to these embodiments once getting knowledge of basic inventive concepts. Thus, the appended claims are intended to be interpreted as including the preferred embodiments and all variations and modifications falling into the scope of the embodiments of the present disclosure.

Finally, it should also be noted that relational terms herein, such as first, second and the like, are used solely to distinguish one entity or operation from another entity or operation, but do not necessarily require or imply that those entities or operations have any such actual relationship or sequence therebetween. Further, the term "include", "contain" or any other variation thereof is intended to cover non-exclusive inclusion, so that a process, a method, an article or a terminal device including a series of elements not only includes those elements, but also includes other elements that are non-explicitly listed or elements that are inherent to such process, method, article or terminal device. In the absence of further restrictions, an element defined by the phrase "including a . . . " does not preclude the existence of other identical elements in the process, the method, the article or the terminal device including the element.

The data processing method and apparatus as provided have been described above in details. The principles and embodiments of the present disclosure are elaborated herein with specific examples, and the description of the foregoing embodiments is only used to facilitate understanding the method and the core idea of the present disclosure. Meanwhile, persons of ordinary skill in the art can make modifications to the embodiments and the application scope based on the idea of the present disclosure. In conclusion, the content of the specification shall not be construed as a limitation to the present disclosure.

What is claimed is:

1. A data processing method, applied to a target device in which a Linux operating system is running, wherein a first program is deployed in the Linux operating system, and the method comprises:

loading a target loading and invasion machine into a first memory space of the first program, and acquiring a vulnerability repair library for the first program through the target loading and invasion machine;

creating, in the first memory space, a second memory space for the target loading and invasion machine, and configuring a second runtime environment isolated from a first runtime environment of the first program, wherein the second memory space is simply available to the target loading and invasion machine and to a program loadable by the target loading and invasion machine;

loading the vulnerability repair library in the second memory space based on the second runtime environment, and performing a vulnerability repair on the first program by using the vulnerability repair library.

2. The method according to claim 1, wherein before performing the vulnerability repair on the first program by using the vulnerability repair library, the method further comprises:

invading target location content in the first program according to invasion and mounting guidance information in the vulnerability repair library, and establishing a mounting relation between the target location content and the vulnerability repair library, wherein the performing the vulnerability repair on the first program by using the vulnerability repair library comprises:

performing the vulnerability repair on the first program by performing, when the first program calls the target location content, a guidance to the vulnerability repair library according to the mounting relation.

3. The method according to claim 2, further comprising: returning to an execution flow of the first program after the vulnerability repair is completed.

4. The method according to claim 2, wherein before invading the target location content in the first program according to the invasion and mounting guidance information in the vulnerability repair library, and establishing the mounting relation between the target location content and the vulnerability repair library, the method further comprises:

performing signature verification on the vulnerability repair library by using preset public key information;

after the signature verification is passed, rendering executions of invading the target location content in the first program according to the invasion and mounting guidance information in the vulnerability repair library and establishing the mounting relation between the target location content and the vulnerability repair library.

5. The method according to claim 1, wherein the target loading and invasion machine comprises: an invader for performing invasion and mounting for the first program; and a loader for creating the second memory space, configuring the second runtime environment, and loading the vulnerability repair library.

6. The method according to claim 1, wherein the vulnerability repair library is acquired by the target loading and invasion machine from a cloud.

7. The method according to claim 1, wherein the target device is an Internet of Things device, and the first program is a user mode program.

8. A data processing apparatus, applied to a target device in which a Linux operating system is running, wherein a first program is deployed in the Linux operating system, and the apparatus comprises:

a processor, a memory, and a computer program stored in the memory and capable of running on the processor, wherein the computer program, when executed by the processor, causes the processor to:

load a target loading and invasion machine into a first memory space of the first program, and acquire a vulnerability repair library for the first program through the target loading and invasion machine;

create, in the first memory space, a second memory space for the target loading and invasion machine, and configure a second runtime environment isolated from a first runtime environment of the first program, wherein the second memory space is simply available to the target loading and invasion machine and to a program loadable by the target loading and invasion machine;

load the vulnerability repair library in the second memory space based on the second runtime environment, and perform a vulnerability repair on the first program by using the vulnerability repair library.

9. A non-transitory computer-readable storage medium, having a computer program stored thereon, wherein the computer program, when executed by a processor, causes the processor to implement the following:

loading a target loading and invasion machine into a first memory space of a first program;

acquiring a vulnerability repair library for the first program through the target loading and invasion machine;

creating, in the first memory space, a second memory space for the target loading and invasion machine;

configuring a second runtime environment isolated from a first runtime environment of the first program, wherein the second memory space is simply available to the target loading and invasion machine and to a program loadable by the target loading and invasion machine;

loading the vulnerability repair library in the second memory space based on the second runtime environment; and performing a vulnerability repair on the first program by using the vulnerability repair library.

10. The apparatus according to claim 8, wherein before performing the vulnerability repair on the first program by using the vulnerability repair library, the processor is further caused to:
    invade target location content in the first program according to invasion and mounting guidance information in the vulnerability repair library;
    establish a mounting relation between the target location content and the vulnerability repair library; and
    perform the vulnerability repair on the first program by performing, when the first program calls the target location content, a guidance to the vulnerability repair library according to the mounting relation.

11. The apparatus according to claim 10, wherein the processor is further caused to:
    return to an execution flow of the first program after the vulnerability repair is completed.

12. The apparatus according to claim 10, wherein before invading the target location content in the first program according to the invasion and mounting guidance information in the vulnerability repair library, and establishing the mounting relation between the target location content and the vulnerability repair library, the processor is further caused to:
    perform signature verification on the vulnerability repair library by using preset public key information; and
    after the signature verification is passed, render executions of invading the target location content in the first program according to the invasion and mounting guidance information in the vulnerability repair library and establish the mounting relation between the target location content and the vulnerability repair library.

13. The apparatus according to claim 8, wherein the target loading and invasion machine comprises:
    an invader for performing invasion and mounting for the first program; and
    a loader for creating the second memory space, configuring the second runtime environment, and loading the vulnerability repair library.

14. The apparatus according to claim 8, wherein the vulnerability repair library is acquired by the target loading and invasion machine from a cloud.

15. The apparatus according to claim 8, wherein the target device is an Internet of Things device, and the first program is a user mode program.

16. The storage medium according to claim 9, wherein the processor is further caused to implement the following:
    invading target location content in the first program according to invasion and mounting guidance information in the vulnerability repair library;
    establishing a mounting relation between the target location content and the vulnerability repair library; and
    performing the vulnerability repair on the first program by performing, when the first program calls the target location content, a guidance to the vulnerability repair library according to the mounting relation.

17. The storage medium according to claim 16, wherein the processor is further caused to implement the following:
    returning to an execution flow of the first program after the vulnerability repair is completed.

18. The storage medium according to claim 16, wherein before invading the target location content in the first program according to the invasion and mounting guidance information in the vulnerability repair library, and establishing the mounting relation between the target location content and the vulnerability repair library, the processor is further caused to implement the following:
    performing signature verification on the vulnerability repair library by using preset public key information; and
    after the signature verification is passed, rendering executions of invading the target location content in the first program according to the invasion and mounting guidance information in the vulnerability repair library and establishing the mounting relation between the target location content and the vulnerability repair library.

19. The storage medium according to claim 9, wherein the target loading and invasion machine comprises:
    an invader for performing invasion and mounting for the first program; and
    a loader for creating the second memory space, configuring the second runtime environment, and loading the vulnerability repair library.

20. The storage medium according to claim 9, wherein the vulnerability repair library is acquired by the target loading and invasion machine from a cloud, a target device is an Internet of Things device, and the first program is a user mode program.

\* \* \* \* \*